(12) United States Patent
Mabuchi

(10) Patent No.: US 6,679,613 B2
(45) Date of Patent: Jan. 20, 2004

(54) SURFACE LIGHT SOURCE DEVICE

(75) Inventor: Koji Mabuchi, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/962,451

(22) Filed: Sep. 26, 2001

(65) Prior Publication Data

US 2002/0036905 A1 Mar. 28, 2002

(30) Foreign Application Priority Data

Sep. 27, 2000 (JP) ........................................ 2000-293768

(51) Int. Cl.[7] ........................ G02F 1/1335; F21V 5/02; F21V 8/00
(52) U.S. Cl. ..................... 362/31; 362/26; 362/330; 362/339; 362/360; 362/561; 349/63
(58) Field of Search ............................. 362/26, 31, 329, 362/330, 331, 332, 339, 351, 561, 27, 360; 349/61, 63, 64, 65

(56) References Cited

U.S. PATENT DOCUMENTS

| | | | | |
|---|---|---|---|---|
| 4,975,808 A | * | 12/1990 | Bond et al. | 362/31 |
| 5,341,231 A | * | 8/1994 | Yamamoto et al. | 349/63 |
| 5,886,759 A | * | 3/1999 | Mashino et al. | 349/113 |
| 5,999,685 A | * | 12/1999 | Goto et al. | 385/146 |
| 6,074,070 A | * | 6/2000 | Sasako | 362/301 |
| 6,151,169 A | * | 11/2000 | Kim | 359/640 |
| 6,174,064 B1 | * | 1/2001 | Kalantar et al. | 362/31 |
| 6,341,872 B1 | * | 1/2002 | Goto | 362/31 |
| 6,345,899 B1 | * | 2/2002 | Ohkawa et al. | 362/31 |
| 6,364,497 B1 | * | 4/2002 | Park et al. | 362/31 |
| 6,386,721 B1 | * | 5/2002 | Hosseini et al. | 362/31 |
| 6,497,939 B1 | * | 12/2002 | Obuchi et al. | 428/156 |
| 6,515,722 B1 | * | 2/2003 | Watanabe | 349/61 |

FOREIGN PATENT DOCUMENTS

JP          10-153778          6/1998

* cited by examiner

Primary Examiner—Alan Cariaso
(74) Attorney, Agent, or Firm—Arent Fox Kintner Plotkin & Kahn, PLLC

(57) ABSTRACT

A surface light source device includes a linear light source, and a light emitted from the linear light source is incident onto one side surface of a light guide plate. The light is then emitted from an upper surface of the light guide plate. A display panel is provided so as to cover an upper surface of the light guide plate. The display panel has two display areas that its translucent rates are different each other. In addition, a light-shielding sheet is provided between the light guide plate and the display area to shield the light emitted from the light guide plate. A light-shielding effect of the light guide plate deteriorates with to a distance from the side surface of the light guide plate, and a luminance irregularity of the light emitted from the light guide plate is absorbed in the light-shielding sheet.

10 Claims, 5 Drawing Sheets (A)

(B)

(C)

SURFACE LIGHT SOURCE DEVICE

BACKGROUND OF THE INVENTION

1. Field of the Invention

The present invention relates to a surface light source device, and more specifically to a surface light device which is applied to a mobile terminal such as a PDA (Personal Digital Assistants), for example.

2. Description of the Prior Art

One example of such a Kind of a surface light source device is disclosed in, for example, Japanese Patent Laying-open No. 10-153778 [G02F 1/1335, F21V 8/00, G02B 6/00] laid-open on Jun. 9, 1998. As shown in FIG. 8 an entire part of this side-light type surface light source device 1 was maintained by a frame 2. The frame 2 was formed in such a manner that an edge of a side of an emitting surface 3a is protruded by a predetermined length L from an incidence surface 3b side of a light scattering and guiding plate 3, and therefore, an illumination light which is incident onto a lower edge 3c of a side of an incidence surface 3b on the light scattering and guiding plate 3 and directly emitted from an emitting surface 3a is shielded by a light emitted from a lam light source 4. Thus a bright line is prevented from being formed in the vicinity of the lamp light source 4 on the emitting surface 3a.

However, in this prior art, due to a fact that the frame 2 was formed in such a manner that an edge of a side of an emitting surface 3a is protruded by a predetermined length L from the incidence surface 3b side of the light scattering and guiding plate 3, the illumination light was shielded, and therefore, the emitting surface 3a becomes narrower.

SUMMARY OF THE INVENTION

Therefore, it is a primary object of the present invention to provide a surface light source device capable of preventing a bright line and securing an emitting surface to the fullest extent.

A surface light source device according to the present invention, comprises: a linear light source which emits a linear light; a light guide plate having one side surface to which an emitted light from the linear light source is incident and an upper surface from which the light is emitted; a translucent member which is arranged as to cover the upper surface of the light guide plate and has a first area of a first translucent rate and a second area of a second translucent rate higher than the first translucent rate; and a light-shielding member which is inserted between the light guide plate and the translucent member and shields a portion of the light emitted from the upper surface of the light guide plate; a light-shielding effect of the shielding member being decreased with distance from the one side surface.

In the surface light source device according to the present invention, a light emitted from the linear light source of a linear shape is incident onto the one side surface of the light guide plate, and in turn, emitted from the upper surface of the light guide plate. A translucent member is provided so as to cover such the light guide plate, and the translucent member has a first area of a first translucent rate and a second area of a second translucent rate higher than the first translucent rate. Furthermore, between the light guide plate and the translucent member, a shielding member is provided to intercept (shield) the light emitted from the light guide plate. The first area is arranged to be closer to the one side surface side of the light guide plate from the second area, i.e. on the linear light source side, and the light-shielding effect of the light-shielding member is decreased with a direction toward the second area from the first area. Therefore, because most of the light which is emitted from the light guide plate and exposing the first area is shielded by the light-shielding member, it is thus possible to prevent from suddenly increasing a luminance or intensity in the vicinity of the linear light source. That is, it is possible to make the light emitted from the second area almost equal.

According to the present invention, because it is possible to prevent from abruptly increasing the luminance in the vicinity of the linear light source by providing the light-shielding member having a light-shielding effect that is continuously varied, a bright line is never formed in the second area. Furthermore, due to a fact that a light can be emitted in the vicinity of the linear light source such as the second area, it is possible to secure the emitting surface to the fullest extent.

In one aspect of the present invention, if and when a negative image formed of a material having the first translucent rate is printed on the first translucent member, it is possible to illuminate the negative image by the light emitted via the light-shielding member.

In one embodiment of the present invention, it is possible to display a color image in the second area because a reflection type liquid crystal panel is arranged at a lower surface of the light guide plate to be opposed to the second area.

In another embodiment of the present invention, if a diffusing member is provided to diffuse a light between the translucent member and the light-shielding member, it is possible to make the light emitted from the second area even more equal. It is noted that the same effect is obtained by providing the diffusing member between the light guide plate and the light-shielding member.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
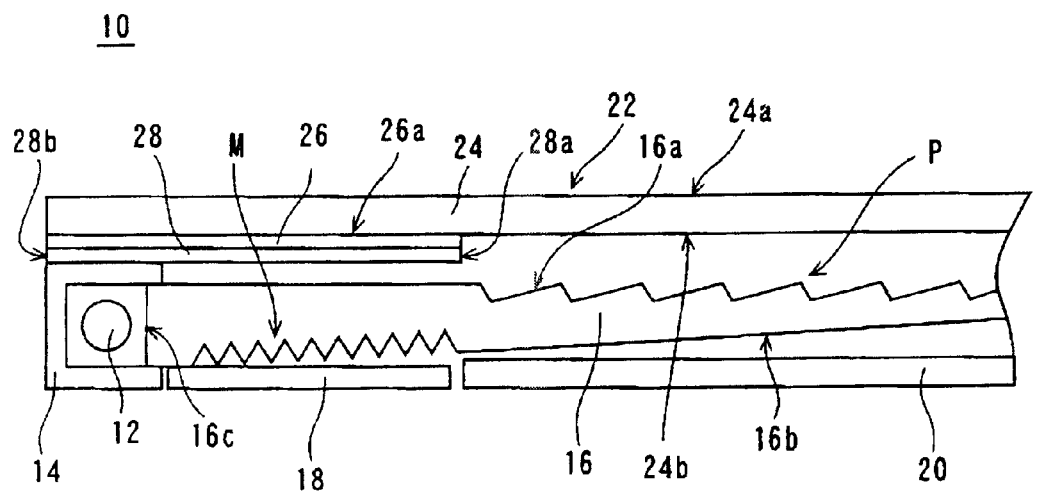
FIG. 1 is an illustrative view showing one embodiment of the present invention.

Referring to FIG. 1, a surface light source device 10 in this embodiment includes a linear light source 12, and the linear light source 12 is held in a reflector 14. The linear light source 12 is a light source having a stick light guiding body which is formed of acrylic resin, for example, and receives and emits a light of a point light source (semiconductor light-emitting device such as LED).

It is noted that the linear light source 12 may be a light source which is formed by a hot cathode fluorescent lamp, a fluorescent lamp, or LEDs arranged in a linear manner.

The reflector 14 is formed of a metal such as aluminum, and its cross section is U-shaped and formed in a rod (stick)-shape manner.

It is noted that the reflector 14 may also be formed by deposing or plating a material with a high reflection rate, e.g. aluminum on a resin.

The surface light source device 10 also includes a light guide plate 16 which is held by the reflector 14 at a side of one end surface (one end portion) 16c of the linear light source 12. At this time, an incidence surface of the light guide plate 16 runs parallel to a longitudinal direction of the linear light source 12. The light guide plate 16 is formed of a material such as a acrylic resin in a plate shape. That is, an upper surface 16a and a lower surface 16b of the light guide plate 16 are formed in a rectangular shape. As shown in FIG. 1 the linear light source 12 is formed in such a manner that a thickness thereof is gradually thinner with a direction from a side of the one side surface 16c (reflector 14 side) to a side of an opposite (other) side surface (not shown). Alternatively, the light guide plate 16 may be formed in a parallel plain plate shape. Furthermore, in a portion of the upper surface 16a of the light guide plate 16 a plurality of prisms P are formed in correspondence to a display area E1 of a panel 20 describe later.

Furthermore, the surface light source device 10 includes a reflection sheet 18 and an LCD (Liquid Crystal Display) panel 20. The reflection sheet 18 is provided at a lower side of the light guide plate 16 to be opposed to the plurality of grooves M. The reflection sheet 18 is formed by densely dispersing air bubbles of several μm to several 10 μm inside a transparent resin sheet, for example.

It is noted that the reflector 14 may also be formed by deposing or plating a material with a high reflection rate, e.g. silver or aluminum onto a resin sheet, a metal plate or the like.

The LCD panel 20 is provided at a lower side of the light guide plate 16 to be opposed to the plurality of prisms P. In other words, the LCD panel 20 in this embodiment is a reflection type color liquid crystal.

Figure 2:
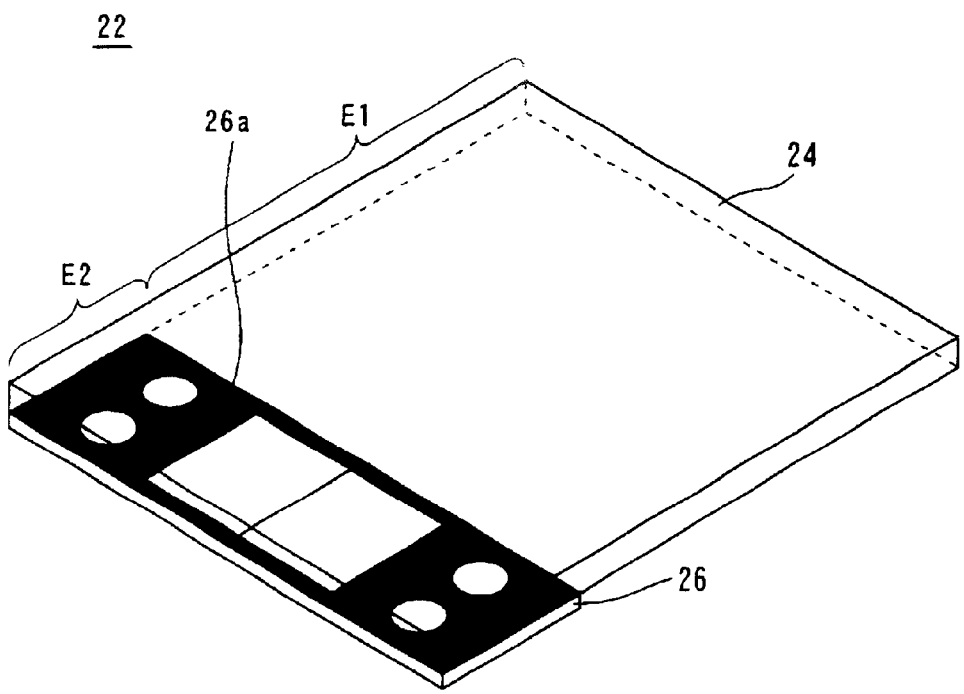
FIG. 2 is an illustrative view showing a display panel shown in FIG. 1 embodiment.

Furthermore, the surface light source device 10 includes a display panel 22 provided above the light guide plate 16. The display panel 22 is formed of a touch panel 24 which entirely covers the light guide plate 16 and a diffusing sheet 26 which partially covers the light guide plate 16. Furthermore, as shown in FIG. 2, the display panel 22 has a display area E1 for a color image displayed by the LCD panel 20 and a display area E2 for a print image, and the diffusing sheet 26 is arranged in a position corresponding to the display area E2 of a lower surface 24b of the touch panel 24.

The touch panel 24 is formed of transparent glass in a plate shape, for example, and its upper surface 24a is formed of a pair of transparent electrodes (not shown), and outputs location information and text information to a controller (not shown) in response to an input by a stylus pen and the user's finger, for example. The diffusing sheet 26 is formed by dispersing materials of which refraction rate differs inside the transparent resin in a sheet shape. On an upper surface 26a of the diffusing sheet 26 a negative image (a monochrome print image in this embodiment) shown in FIG. 2 is printed.

It is noted that the touch panel 24 and the diffusing sheet 26 also cover an upper surface of the reflector 14, and end portions at a side of the linear light source 12 of the both are brought into contact with a rear surface of the reflector 14.

Furthermore, although the print image is to be printed on the upper surface 26a of the diffusing sheet 26 in this embodiment, it may be also possible to print on a position corresponding to the display area E2 of the lower surface 24b of the touch panel 24.

Figure 3:
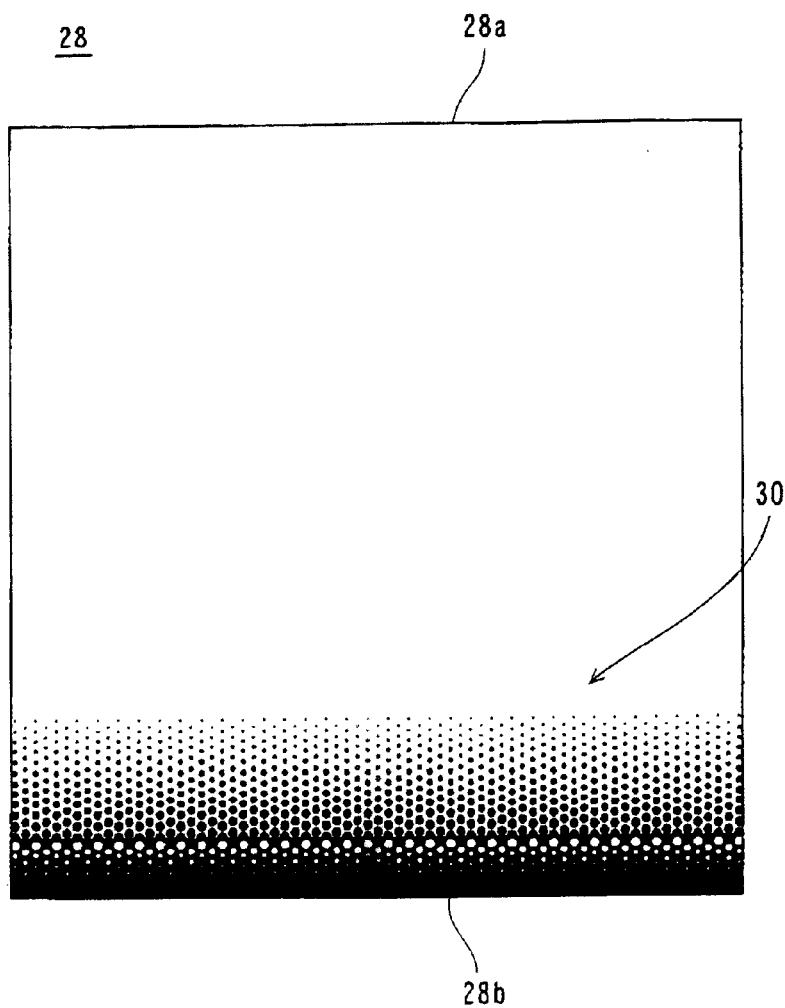
FIG. 3 is an illustrative view showing a light-shielding sheet shown in FIG. 1 embodiment.

A light-shielding sheet 28 is provided below the diffusing sheet 26. The light-shielding sheet 28 is fixed to the reflector 14 by a double-faced tape, for example, and as shown in FIG. 3, the light-shielding sheet 28 is formed by printing a black or neutral-gray pattern 30 is printed on a transparent resin in a sheet shape. In addition, the light-shielding sheet 28 is adhered to the reflector 14 in such a manner that a lower end 28b is faced toward the reflector 14 as shown in FIGS. 1 and 2. The pattern 30 is formed in such a manner that its light-shielding effect is gradually decreased with a direction from a lower end 28b to an upper end 28a of the light-shielding sheet 28.

To be easily understood, the light-shielding sheet 28 is provided with a thickness in FIG. 1, but this is in fact formed in a thin sheet shape. The same is also applied to below described FIGS. 4 to 6.

Figure 4:
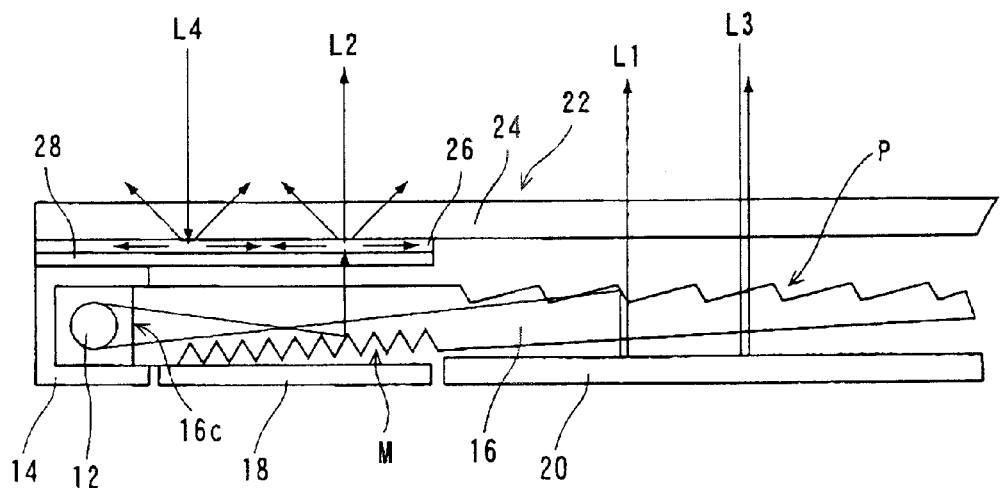
FIG. 4 is an illustrative view showing a light path of a light emitted from a linear light source of a surface light source device shown in FIG. 1 embodiment.
Figure 5:
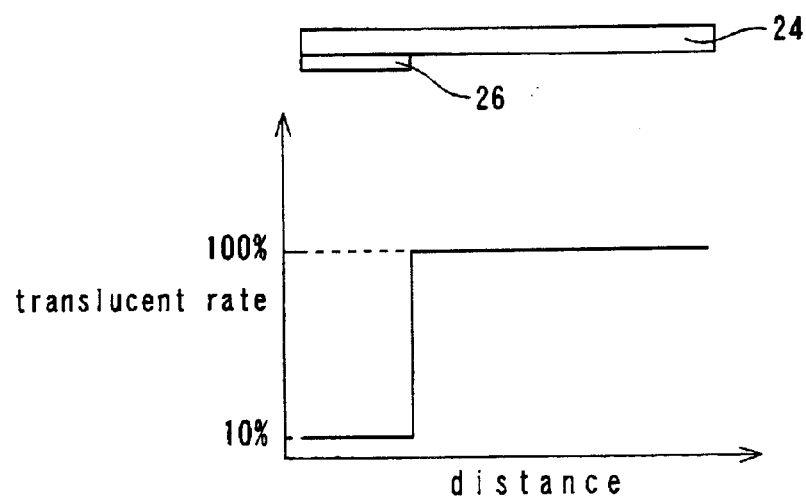
FIG. 5(A) is a graph showing a translucent rate distribution of the surface light source device shown in FIG. 1 embodiment.
FIG. 5(B) is a graph showing a luminance distribution of the light emitted from a light guide plate shown in FIG. 1 embodiment, a luminance distribution of a light incident onto a display panel via a light-shielding sheet, and a luminance distribution of a light incident onto a touch panel via a diffusing sheet.
FIG. 5(C) is a graph showing a luminance distribution of a light emitted from the touch panel shown in FIG. 1 embodiment.
Figure 5:
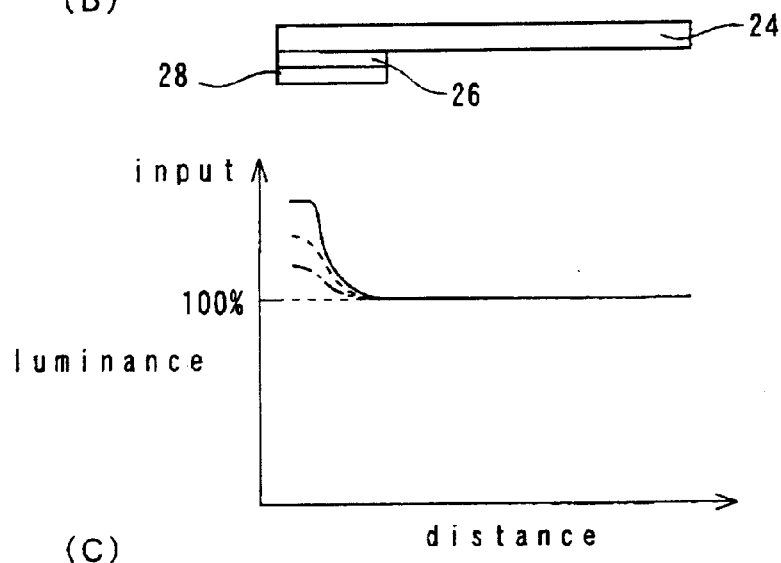
Figure 5:
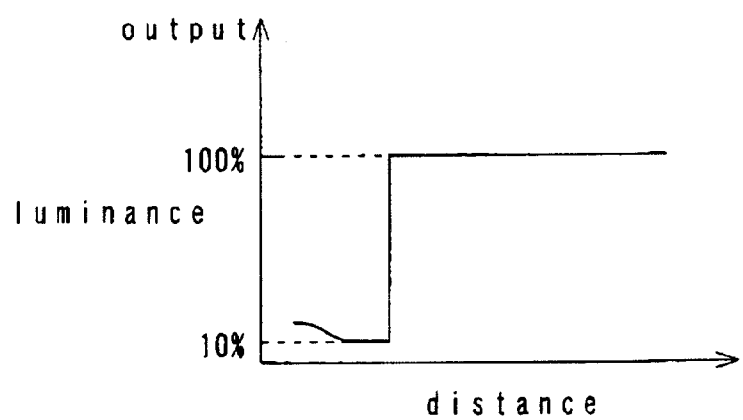

In the surface light source device 10, a portion of the light emitted from the linear light source 12 is emitted from the display area E1 of the display panel 22 through a light path L1 shown in FIG. 4. At this time, the light emitted from the linear light source 12 is incident onto the light guide plate 16 from the one side surface 16c, and refracted at the prisms P, and irradiated (incident) onto the LCD panel 20. Subsequently, the light is reflected by the LCD panel 20, and emitted via the touch panel 24. Therefore, it is possible to display a color image.

Furthermore, another portion of the light emitted from the linear light source 12 is emitted from the display area E2 of the display panel 22 through a light path L2, for example. At this time, the light from the linear light source 12 is incident on the linear light source 16 from its one side surface 16c, reflected by the grooves M or the reflection sheet 18, and incident on the diffusing sheet 26 via the light-shielding sheet 28. The light is diffused by the diffusing sheet 26, and emitted via the touch panel 24. Due to this, the print image printed on the upper surface 26a of the diffusing sheet 26 is illuminated.

In the surface light source device 10 the color image is thus displayed in accordance with a so-called front light system by the light emitted from the linear light source 12, and the print image is illuminated in accordance with a so-called back light system.

Furthermore, a natural light is incident on the LCD panel 20 via the touch panel 24 and the light guide plate 16 as shown by a light path L3, and reflected by the LCD panel 20. The reflected light is emitted via the light guide plate 16 and the touch panel 24. In this manner, it is also possible to display a color image. In addition, the natural light is incident on the diffusing sheet 26 via the touch panel 24 as shown by a light path L4, for example. On the diffusing sheet 26 the natural light is diffused and reflected, and emitted via the touch panel 24. In this manner, it is also possible to illuminate the print image. In a case that the natural light is thus utilized, consumed electricity of the surface light source 10 can be reduced because there is no need to light the linear light source 12.

Furthermore, another portion of the light incident on the light guide plate 16 from the linear light source 12 is directly exposed on the light-shielding sheet 28. An intensity of such the light is stronger than that of a light reflected on the light guide plate 16, the grooves M or the reflection sheet 18 and irradiated on the light-shielding sheet 28. However, on the light-shielding sheet 28 the pattern 30 of which light-shielding effect continuously deteriorates as moved from the lower end 28b to the upper end 28b (with a distance from the linear light source 12) is formed, and an amount of light of a transmitted light through the touch panel 24 (display panel 22) is controlled by the pattern 30. Due to this, an irregularity of the light intensity is suppressed, and a luminance level of the light emitted from the display area E2 of the display panel 22 is rendered almost equal. As a result, no bright line is formed in the display area E2.

More specifically, the translucent rate of the display panel 22 formed of the touch panel 24 and the diffusing sheet 26 is shown as in FIG. 5(A). That is, on the assumption that the translucent rate of the display area E1 of the color image is set at 100%, the translucent rate of the display area E2 of the print image is 10%.

Furthermore, a luminance distribution of the light inputted (incident) onto such the display panel 22 and the light-shielding sheet 28, i.e. a luminance distribution of the light emitted from the light guide plate 16 is shown as in FIG. 5(B). That is, as described above, in the vicinity of the linear light source 12, the luminance is drastically increased by the light emitted via the light guide plate 16 from the linear light source 12.

The emitted light of such the high luminance is irradiated on the light-shielding sheet 28, and a portion of such an irradiated light is shielded by the pattern 30. Therefore, at a stage of being emitted from the light-shielding sheet 28, the luminance is lowered to a level indicated by a dotted line in FIG. 5(B). In addition, on an upper surface of the light-shielding sheet 28 light diffusing sheet 26 is laminated, and therefore, the light emitted from the light-shielding sheet 28 is diffused by the light diffusing sheet 26. Due to this, the luminance is decreased to a level indicated by a one-dotted line in FIG. 5(B) at a stage of being emitted from the light diffusing sheet 26.

As described above, the translucent rate of the display area E2 is 1/10 that of the display area E1. As a result, the luminance of the light emitted from the display panel 22 is changed as shown in FIG. 5(C). According to FIG. 5(C), although the luminance irregularity is caused in the display area E2, such the luminance irregularity is no more than several % due to a fact that the luminance is lowered by the light-shielding sheet 28 and the light diffusing sheet 26. In other words, the luminance irregularity in the display area E2 is rendered too minimal to be apparently noticed to the eye's of people.

Figure 6:
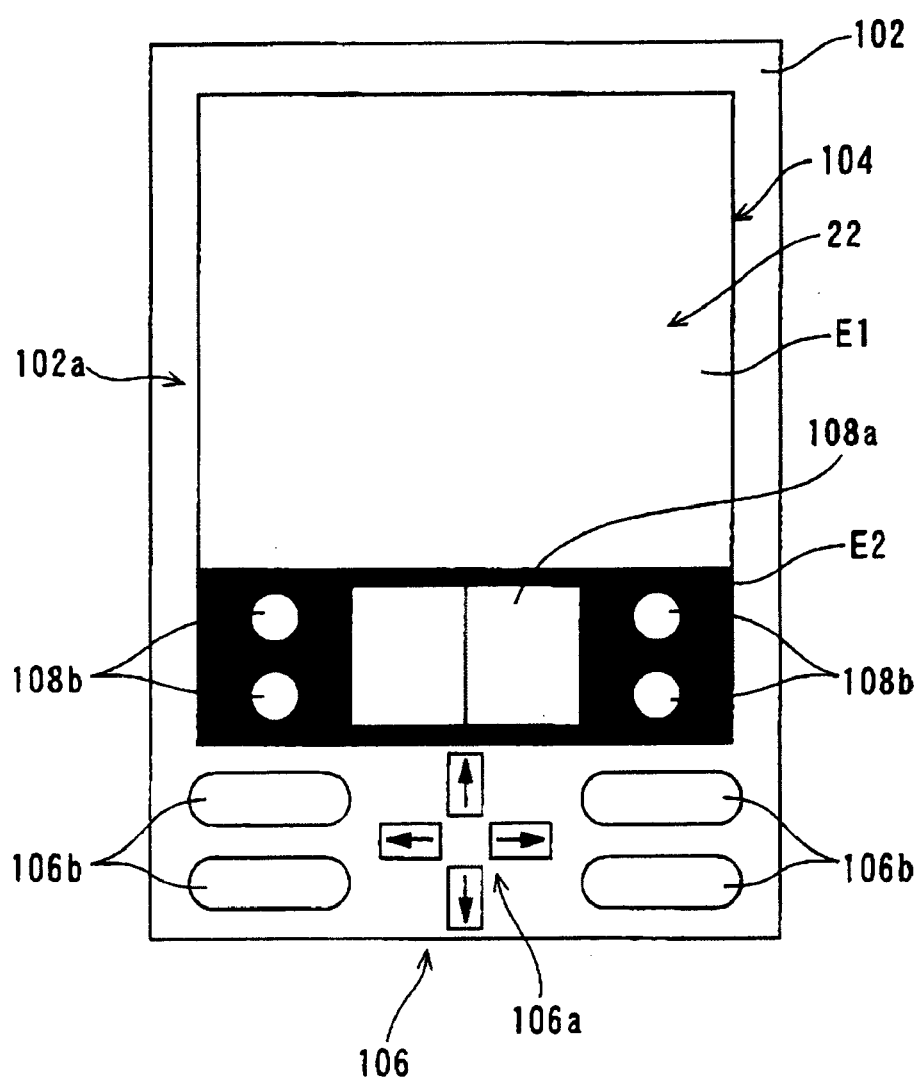
FIG. 6 is an illustrative view showing another embodiment of the present invention.

Such the surface light source device 10 is applied to a PDA (Personal Digital Assistants) 100 shown in FIG. 6, for example. The PDA 100 includes a case 102, and the surface light source device 10 is mounted inside the case 102 in such a manner that the display panel 22 is arranged at a window 104 provided on a upper surface 102a of the case 102. In addition, on an upper surface of the PDA 100 an operation panel 106 is provided, and crisscross keys 106a and other input keys 106b are formed on the operation panel 106.

In the PDA 100, (short cut) icons to start programs installed by the user are displayed on the display area E1. In addition, the display area E2 includes an area 108a that the user can input texts and the like with a stylus pen and an area 108b displaying various buttons, e.g. a search button, a menu button and etc. to be inputted by the stylus pen.

Therefore, the user can confirm, input, correct and delete personal information and the like, for example by operating the operation panel 106 of the PDA 100, inputting a text with the stylus pen and specifying the icon.

According to this embodiment, since a luminance irregularity is absorbed by the light-shielding sheet, it is possible to relatively minimize the luminance of the light inputted in the display area for the print image provided on the display panel. Due to this, it becomes possible to prevent to produce a bright line. Furthermore, it is possible to secure an emitting surface to the fullest extent because it is possible to emit a light in the vicinity of a linear light source such as the display area for the print image.

Figure 7:
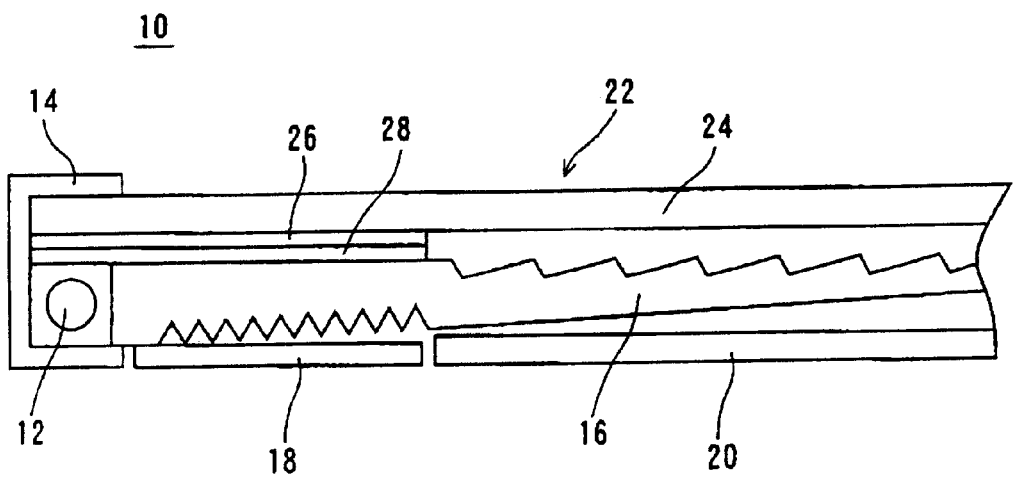
FIG. 7 is an illustrative view showing one example of a conventional surface light source device.
Figure 8:
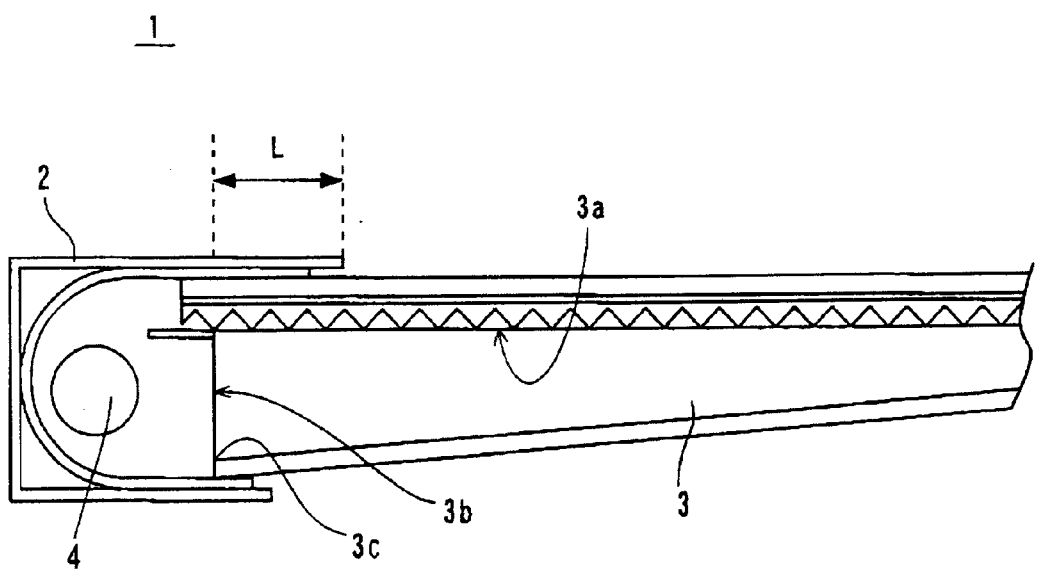
FIG. 8, is an illustrative view showing an example of a prior art surface light source device.

A surface light source device 10 in another embodiment shown in FIG. 7 is the same FIG. 1 embodiment except that the display panel 22 and the light-shielding sheet 28 are held by the reflector 14, and therefore, duplicated descriptions will be omitted here.

In the surface light source device 10 of this another embodiment, an opening portion of the reflector 14 is made larger than that of FIG. 1 embodiment by thicknesses of the touch panel 24, the diffusing sheet 26 and the light-shielding sheet 28, and therefore, the display panel 22 and the light-shielding sheet 28 can be also accommodated in the opening portion in addition to the light guide plate 16. Accordingly, it becomes possible to heighten a holding force of the light guide plate 16 compared to that of FIG. 1 embodiment. Therefore, in a case of being applied to a mobile terminal such as a PDA, there seldom occurs that the light guide plate is slipped and the light guide plate is removed out of the reflector even when impacts and vibrations are applied to the mobile terminal.

It is noted that, although a negative image such as a monochrome print image is printed on the diffusing sheet in these embodiments, it may be also possible to print a negative image using another single color or a plurality of colors.

In addition, although the light-shielding sheet is provided on a top surface of the linear light source, and the light diffusing sheet is laminated on a top surface of the light-shielding sheet in these embodiments, it may be possible to reverse a laminating order of the light-shielding sheet and the light diffusing sheet. In other words, the light-diffusing sheet may be provided on a top surface of the light-shielding sheet. However, in this case, for the sake of an outer appearance there is a need to make a pattern of the light-shielding sheet still finer because the pattern of the light-shielding sheet comes into people's attention. Furthermore, in this case the print image is illuminated darker than a case shown in the above described embodiments because the light of the natural light is also shielded by the light-shielding sheet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display device, comprising: a linear light source which emits a linear light;
   a light guide plate having one side surface on which a light emitted from said linear light source is incident, and a top surface from which the light is emitted;
   a translucent member which is provided so as to cover said top surface of said light guide plate, and has a first area of a first translucent rate and a second area of a second translucent rate higher than said first translucent rate;
   a light-shielding member which is inserted between said light guide plate and said translucent member, and shields a portion of the light emitted from said top surface of said light guide plate, a light-shielding effect of said light-shielding member being decreased with a distance from said one side surface; and
   a reflection type LCD panel arranged below a lower surface of said light guide plate such that said LCD panel is in correspondence in position to said second area.

2. A display device according to claim 1, wherein a negative image formed of a material having said first translucent rate is printed on said first area of said translucent member.

3. A display device according to claim 1, wherein said light guide plate is formed with a prism in one portion of the top surface for a front-light display, and formed with a groove in one portion of a bottom surface thereof for a backlight display.

4. A display device according to claim 3, wherein said LCD panel is a color LCD panel.

5. A display device according to claim 4, wherein said second area is displayed with a color image by the front-light display.

6. A display device according to claim 4, wherein a negative image in said first area is irradiated by the light emitted from the bottom surface of said light guide plate.

7. A display device according to claim 2, wherein said light guide plate is formed with a prism in one portion of the top surface for a front-light display, and formed with a groove in one portion of a bottom surface thereof for a backlight display.

8. A display device according to claim 7, wherein said LCD panel is a color LCD panel.

9. A display device according to claim 8, wherein said second area is displayed with a color image by the front-light display.

10. A display device according to claim 8, wherein a negative image in said first area is irradiated by the light emitted from the bottom surface of said light guide plate.

\* \* \* \* \*